United States Patent [19]

Foster

[11] Patent Number: 4,807,474
[45] Date of Patent: Feb. 28, 1989

[54] SIGHT GLASS ASSEMBLY

[75] Inventor: Robert J. Foster, Leawood, Kans.

[73] Assignee: Pressure Products Company, Inc., Charleston, W. Va.

[21] Appl. No.: 132,626

[22] Filed: Dec. 7, 1987

Related U.S. Application Data

[63] Continuation of Ser. No. 820,229, Jan. 21, 1986, abandoned.

[51] Int. Cl.$^4$ .............................................. G01F 23/02
[52] U.S. Cl. ........................................ 73/331; 73/334; 116/276
[58] Field of Search .................. 73/334, 325, 331; 116/276; 350/319; 220/82 A, 377; 137/559

[56] References Cited

U.S. PATENT DOCUMENTS

| | | | |
|---|---|---|---|
| 298,469 | 5/1884 | Hornig | 116/276 |
| 1,179,441 | 4/1916 | Lewis | 116/276 |
| 1,189,922 | 7/1916 | Daly | 73/331 |
| 2,820,430 | 1/1958 | Pulaski | 116/276 |
| 3,088,811 | 5/1963 | Jones | 16/276 |
| 3,307,400 | 3/1967 | LeRoy | 73/331 |
| 3,335,607 | 8/1967 | Seekins | 73/334 |
| 3,625,390 | 12/1971 | Meginnis | 73/334 |
| 3,880,005 | 4/1975 | Butterfield et al. | 73/334 |
| 3,941,460 | 3/1976 | Meginnis | 73/334 |
| 4,162,826 | 7/1979 | VanderBeck et al. | 73/325 |
| 4,468,095 | 8/1984 | Meginnis | 73/334 |

FOREIGN PATENT DOCUMENTS 141781 4/1920 United Kingdom ................ 350/319

Primary Examiner—William A. Cuchlinski, Jr.
Assistant Examiner—Thomas B. Will
Attorney, Agent, or Firm—Lalos & Keegan

[57] ABSTRACT

A sight glass assembly comprising a housing adapted to be mounted on a wall, the housing having a bore therethrough, the housing bore having an enlarged section providing a shoulder, a lens disposed in the enlarged bore section and seated on the shoulder, at least one deformable O-ring mounted on the lens and disposed between a periphery of the lens and a wall of the enlarged bore section of the housing, a retainer member threadedly mounted on the housing, the retainer member having a bore therethrough disposed in alignment with the housing bore when the retainer member is threadedly munted on the housing, the retainer bore having an enlarged section providing a shoulder and the lens being disposed between the housing and the retainer shoulders, the retainer member having a member receivable within the enlarged housing bore section between the housing and the lens when the retainer member is threadedly mounted on the housing for compressing the O-ring against the housing shoulder and causing the O-ring to expand laterally and place the lens in peripheral compression, and a shoulder provided on the retainer member for restricting the travel of the compression member into the enlarged housing bore section.

12 Claims, 2 Drawing Sheets

SIGHT GLASS ASSEMBLY

This is a continuation of co-pending application Ser. No. 820,229 filed on Jan. 21, 1986 now abandoned.

BACKGROUND OF THE INVENTION

This invention relates to a sight glass assembly and more particularly to an assembly for viewing the interior of a vessel or conduit containing a fluid under pressure, which is capable of preventing a blowout of the lens of the assembly whenever such lens becomes fractured.

In the prior art, there has been developed a type of sight glass assembly adapted to be mounted on vessels containing fluids under pressure, wherein the lens thereof is placed in radial compression to prevent a blowout of the lens upon the lens becoming fractured. Examples of such an assembly is disclosed in U.S. Pat. Nos. 3,345,872, 3,746,431 and 3,951,301 to Charles E. Meginnis. Each of such patents discloses a sight glass assembly generally consisting of a housing provided with a bore therethrough, a lens seated on a shoulder provided in the housing bore, a packing disposed between the periphery of the lens and the wall of the housing bore, and a compression ring also disposed between the lens and the housing which may be forced against the packing, usually by a set of screws, to cause the packing to expand laterally and, correspondingly, place the lens in radial compression.

In the manufacture of such assemblies, it has been found that the cost of manufacture is comparatively high because of the typically low volume runs of such units, the substantial number of components of different sizes and materials which have to be inventoried for units of different specifications and the high cost of the materials of the components and the labor involved in machining and assembling such components.

Because if the relatively high cost of manufacture of such assemblies, it is found to be desirable to provide an assembly of the type as described in which the lens is placed under radial compression to prevent the lens from blowing out upon becoming fractured, which is more simple in design and more economical to manufacture.

OBJECTS OF THE INVENTION

Accordingly, the principal object of the present invention is to provide an improved sight glass assembly.

Another object of the present invention is to provide an improved sight glass assemby mountable on the wall of a vessel for viewing the interior of such a vessel.

A further object of the present invention it to provide an improved sight glass assembly mountable on a wall of a vessel containing a fluid under pressure for viewing the interior of the vessel, in which the lens of such assembly will be prevented from blowing out by the pressure of the fluid in the vessel whenever such lens may be fractured.

Another object of the present invention is to provide an improved sight glass assembly mountable on a wall of a vessel containing a fluid under pressure in which the assembly includes a lens placed under radial compression to prevent a blowout of the lens whenever the lens may become fractured.

A further object of the present invention is to provide an improved sight glass assembly mountable on a wall of a vessel containing a fluid under conditions of full vacuum to 10,000 psi and temperatures between $-350°$ to $400°$ F. in which the lens of the assembly is prevented from blowing out whenever the lens of the assembly becomes fractured.

A still further object of the present invention is to provide an improved fluid flow device having means for viewing the flow of fluid therethrough in which the viewing means includes a lens which will be prevented from blowing out whenever the lens becomes fractured.

Another object of the present invention is to provide an improved sight glass assembly on a vessel or conduit wall for viewing the interior of such a vessel or conduit which is comparatively simple in design, relatively inexpensive to manufacture and highly effective in performance.

Other objects and advantages of the present invention will become more apparent to those persons having ordinary skill in the art to which the present invention pertains from the following description taken in conjunction with the accompanying drawings.

DETAILED DESCRIPTION OF THE PREFERRED EMBODIMENT

Figure 1:
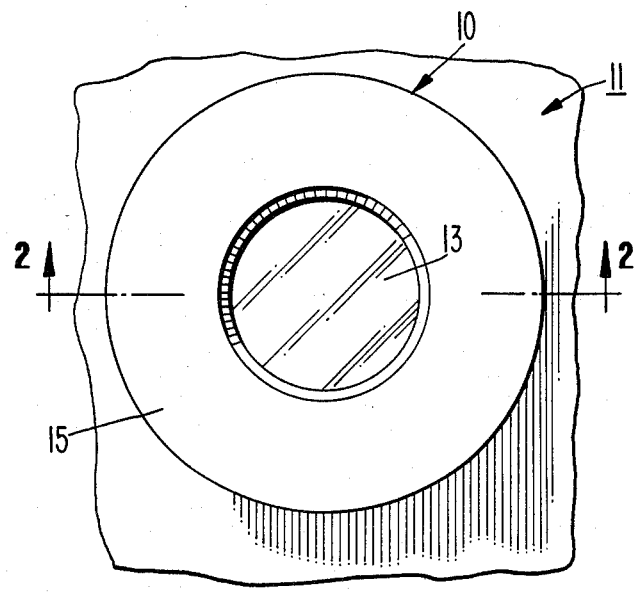
FIG. 1 is a top plan view of an embodiment of the present invention.
Figure 2:
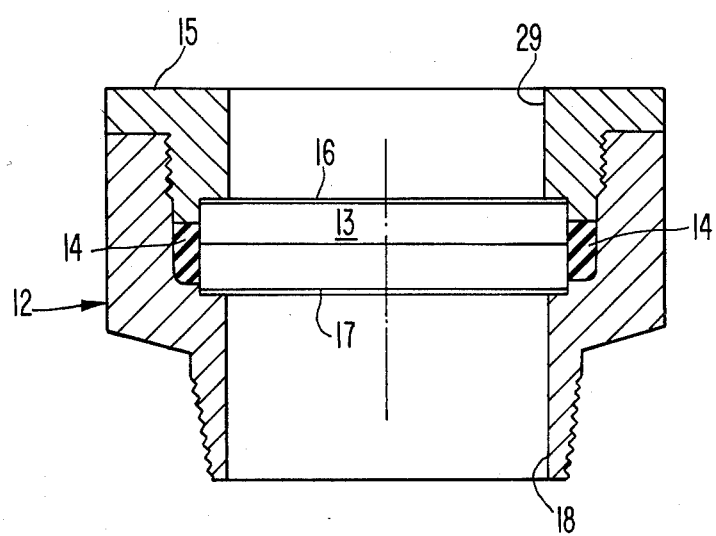
FIG. 2 is an enlarged, vertical cross-sectional view taken along line 2—2 in FIG. 1.
Figure 3:
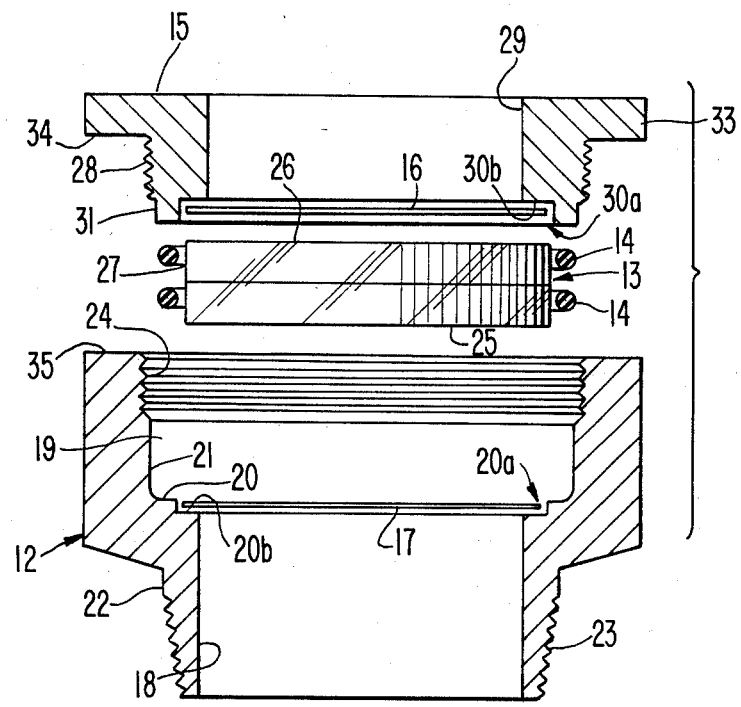
FIG. 3 is a view similar to the view shown in FIG. 2, illustrating the components thereof in exploded relation.

Referring to FIGS. 1 through 3, there is illustrated a sight glass assembly 10 which is adapted to be mounted in a threaded opening of a wall 11 of a vessel containing a fluid under pressure. The assembly consists of a housing 12 mountable on a vessel wall, a laminated lens 13 mounted in the housing, a pair of deformable sealing rings such as O-rings 14, 14 disposed between the lens and the housing a retainer 15 threadedly mounted on the housing and a pair of gaskets 16 and 17.

Housing 12 is provided with a bore 18 therethrough having an enlarged section 19 providing an annular shoulder 20 and a an annular wall 21. Shoulder 20 is provided with an annular recess 20a having an annular shoulder 20b on which gasket 17 is seated. The inner end of the housing is provided with a reduced portion 22 having an exterior, tapered threaded portion 23 for threading the housing into the access opening provided on the vessel wall. The outer end of the housing is provided with an internally threaded portion 24 in which the retainer may be threaded into the housing.

Laminated lens 13 is provided with an inner circular surface 25, the periphery of which is adapted to be seated on gasket 17 in annular recess 20b, an outer circular surface 26 on which gasket 16 is seated and an annular side wall 27 which is adapted to be spaced from annular wall 21 when the lens is seated on gasket 17 in annular recess 20b. O-rings 14 are placed on annular surface 27 of the lens so that when the lens is placed in the housing, the O-rings will be positioned in the annular space between annular lens surface 27 and annular wall 21.

Retainer 15 is provided with a set of exterior threads 28 which are adapted to be threaded into the threaded portion 24 of the housing and a bore 29 which is adapted to be aligned with housing bore 28 when the retainer is threaded into the housing. The retainer is provided with an annular recess 30a having an annular shoulder 30b adapted to engage gasket 16, and is provided with an annular compression ring portion 31 adapted to be received within the annular space provided between the lens and the housing, with an inner annular surface 32 engaging the outer O-ring. The outer end of the retainer is provided with a laterally projecting annular flange portion 33 providing an inwardly facing annular surface 34 engageable with an outer anular surface 35 of the housing.

In the assembly of the embodiment of the invention shown in FIGS. 1 through 3, the housing is first placed on a working surface and gasket 17 is inserted into the housing and seated on annular shoulder 20b. The O-rings are then placed about the lens and the lens is placed into the housing and seated on gasket 11 with the O-rings disposed in the annular space between the lens and the housing. Gasket 16 is then placed on the outer surface of the lens and the retainer is threaded into the housing until annular surface 34 engages the housing to limit the insertion of the retainer into the housing. As the retainer is threaded into the housing, annular compression ring portion 31 engages the outer O-ring and compresses the O-rings against shoulder 20 causing the O-rings to deform and expand radially to place the lens in radial compression. Prior to inserting the retainer into the housing, a lubricant is applied to O-ring engaging surface 32 so that as the annular compression ring portion of the retainer engages the O-ring and is rotated, binding of the outer O-ring will be avoided.

The relationships of the dimensions between surfaces 32, 34, 35 and surfaces of shoulders 20, 20a, 20b are selected so that when the retainer is threaded into the outer end of the housing in assembling the unit, and surface 34 of the retainer engages outer surface 35 of the housing, the annular surface 32 of annular compression ring portion 31 of the retainer engages the outer O-ring and imparts a sufficient force to expand the O-rings laterally and place the lens under a predetermined, radial compression, while annular shoulder 30b of the retainer engages gasket 16 with a force sufficient to compress cushioning gasket 17 but insufficient to place the lens under undue tensile stress. The predetermined compressive force applied radially on the lens should be sufficient to cause the lens to withstand conditions of full vacuum to 10,000 psi and temperatures between −350° to 400° F. without causing a fractured lens to blow out. The dimensions of the retainer and housing are selected in a manner whereby the lens will be placed under proper radial compression while the lens will be free from any undue tensile stress when an assembler simply threads the retainer into the housing without taking any special precautions in applying any particular torque to the retainer.

The housing and retainer components of the assembly preferably are cast of any suitable metals ormetal alloys, depending on the application, and are machined in the conventional manner. The lens may be formed of any suitable glass including tempered glass or of a suitable plastic material, again, depending on the application. The O-rings also may be formed of any suitable material, depending again on the application, and may be formed of any elastomeric material such as a hard rubber material.

Figure 4:
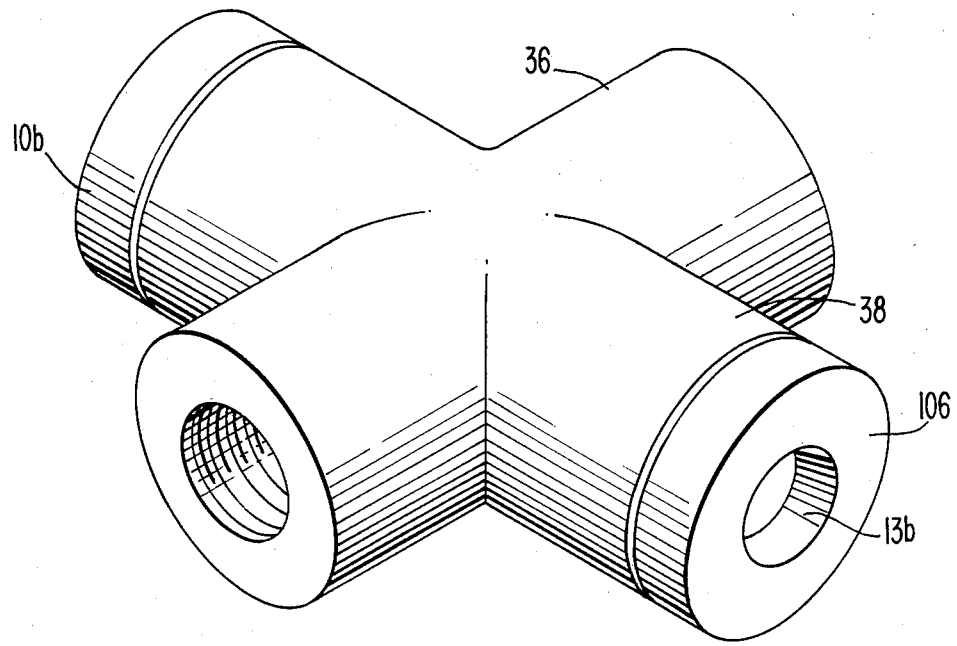
FIG. 4 is another embodiment of the present invention consisting of a fluid flow device provided with a pair of sight glass assemblies as shown in FIGS. 1 through 3.

Referring to FIG. 4, there is illustrated another embodiment of the invention consisting of a fluid conduit 36 provided with a pair of transversely aligned bosses 37 and 38 formed integrally with opposed side walls of the conduit. The outer ends of the bosses are formed similarly to the outer end of the housing described in connection with the embodiments shown in FIGS. 1 through 3, and sets of lenses, sealing rings or O-rings, gaskets and retainers, also as described in connection with the embodiments shown in FIGS. 1 through 3, are mounted on the ends of the bosses, designated by the reference number 10b, so that the interior of conduit 36 may be viewed through transversely aligned lenses 13b of sight glass assemblies 10b mounted on the outer ends of bosses 37 and 38.

Conduit 36 with integral bosses 37 and 38 may be formed by casting or forging, and may be formed of any suitable material depending on the application of the device. The raw casting or forging may then be threaded on the conduit ends either internally or exteriorly or provided with annular mating flanges for connecting the conduit in a fluid line. The boss portions of the device smilarly may be machined to provide the internal configurations for receiving the various components of the sight glass assemblies.

In each of the embodiments of the invention as described, there is provided a device which utilizes a minimal number of components, requires a minimum number of conventional machining operations and is simple to assemble to apply the desired types of forces on the lenses of the devices which will place the lenses in radial compression so that they will not blow out if they become fractured yet not incur any undue tensile stress which will result in failure.

From the foregoing detailed description,, it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited solely by the appended claims.

I claim:

1. A sight glass assembly, comprising:
a housing adapted to be mounted on a wall, said housing having an outer annular surface and a bore therethrough, said housing bore having an enlarged bore section provided with a recess aligned with said housing bore, said recess having a shoulder;
a lens partially disposed within said recess and extending through said enlarged bore section seating on said shoulder, at least one deformable sealing ring mounted on said lens and disposed between a periphery of said lens and a wall of said enlarged bore section;
a retainer member threadedly mounted on said housing, said retainer member having a laterally projecting annular flange portion provided with an inwardly facing annular surface and a bore therethrough disposable in alignment with said housing bore when said retainer member is mounted on said housing, said retainer bore having a recess aligned with said retainer bore, said recess having a shoulder with said lens being disposed between said housing and retainer shoulders, both recesses in said retainer and said enlarged bore section being approximately the same size as a cross section of said lens, said retainer member having compressing means receivable within said enlarged housing bore section between said housing and said lens when said retainer member is mounted on said housing for compressing said at least one deformable sealing ring against said housing shoulder and causing said sealing ring to expand laterally and place said lens in peripheral compression; and means for restricting the travel of said retainer member into said housing defined by said inwardly facing annular surface of said retainer member being engageable with said outer annular surface of said housing when said retainer member is threaded into said housing.

2. A sight glass assembly according to claim 1 including gaskets disposed between said lens and both said housing and retainer shoulders.

3. A sight glass assembly according to claim 1 wherein said enlarged bore section of said housing and said retainer are annular, said enlarged section being provided with a set of threads cooperable with a set of external threads provided on said retainer.

4. A sight glass assembly according to claim 1 wherein said travel restricting means of said retainer is operable to prevent said retainer from exerting a force on said lens sufficient to place said lens under undue tensile stress.

5. A sight glass assembly according to claim 1 wherein said travel restricting means of said retainer is operable to exert a force against said sealing ring sufficient to cause said sealing ring to deform laterally and place said lens in peripheral compression yet insufficient to exert a force against said lens to place said lens under undue tensile stress.

6. A sight glass assembly according to claim 1 wherein said recess having a shoulder provided in said enlarged bore section of said housing bore is annular, said lens has an annular peripheral side wall engageable by said sealing ring to place said lens in radial compression, and wherein said compressing means engageable with said sealing ring to deform said sealing ring laterally, is annular.

7. A sight glass assembly according to claim 1 wherein said lens comprises a laminated lens, and wherein said at least one sealing ring is a pair of O-rings is mounted on said lens.

8. A sight glass assembly according to claim 1 wherein said sealing ring is formed of a hard rubber material.

9. A sight glass assembly according to claim 8 wherein said sealing ring is an O-ring with a surface of said compression means engageable with said O-ring being provided with a lubricant to prevent binding of said O-ring when said retainer is mounted on said housing.

10. A sight glass assembly according to claim 1 wherein said at least one sealing ring is an O-ring.

11. A fluid flow device, comprising:

a conduit for conducting a fluid along a line of travel therein, opposed wall portions of said conduit having a pair of aligned bores therethrough disposed along a centerline intersecting the line of travel of said fluid, each opposed wall portion having an outer annular surface, each of said conduit bores having an enlarged bore section provided with a recess aligned with a respective conduit bore, each rescess having a shoulder;

a lens partially disposed within said recess and extending through said enlarged conduit bore section seating on said shoulder, at least one deformable sealing ring mounted on said lens and disposed between a periphery of said lens and a wall of said enlarged conduit bore section;

a retainer member threadedly mounted on said conduit, said retainer member having a laterally projecting annular flange portion provided with an inwardly facing annular surface and a bore therethrough disposable in alignment with said conduit bores, when said retainer is threadedly mounted on said conduit, said retainer bore having a recess aligned with said retainer bore, said recess having a shoulder with said lens being disposed between said housing and retainer shoulders, both recesses in said retainer and said enlarged section being approximately the same size as a cross section of said lens;

said retainer having compressing means receivable within said enlarged conduit bore section between said housing and said lens when said retainer is threadedly mounted on said conduit for compressing said sealing ring against said conduit shoulder and causing said sealing ring to expand laterally and place said lens in peripheral compression; and means for restricting the travel of said retainer member into said conduit defined by said inwardly facing annular surface of said retainer member being engageable with said outer annular surface of said housing when said retainer member is threaded into said housing.

12. The fluid flow device according to claim 11, wherein said sealing ring is an O-ring.

* * * * *